No. 862,792.
PATENTED AUG. 6, 1907.
P. X. BEAULIEU.
BRAKE.
APPLICATION FILED APR. 11, 1907.
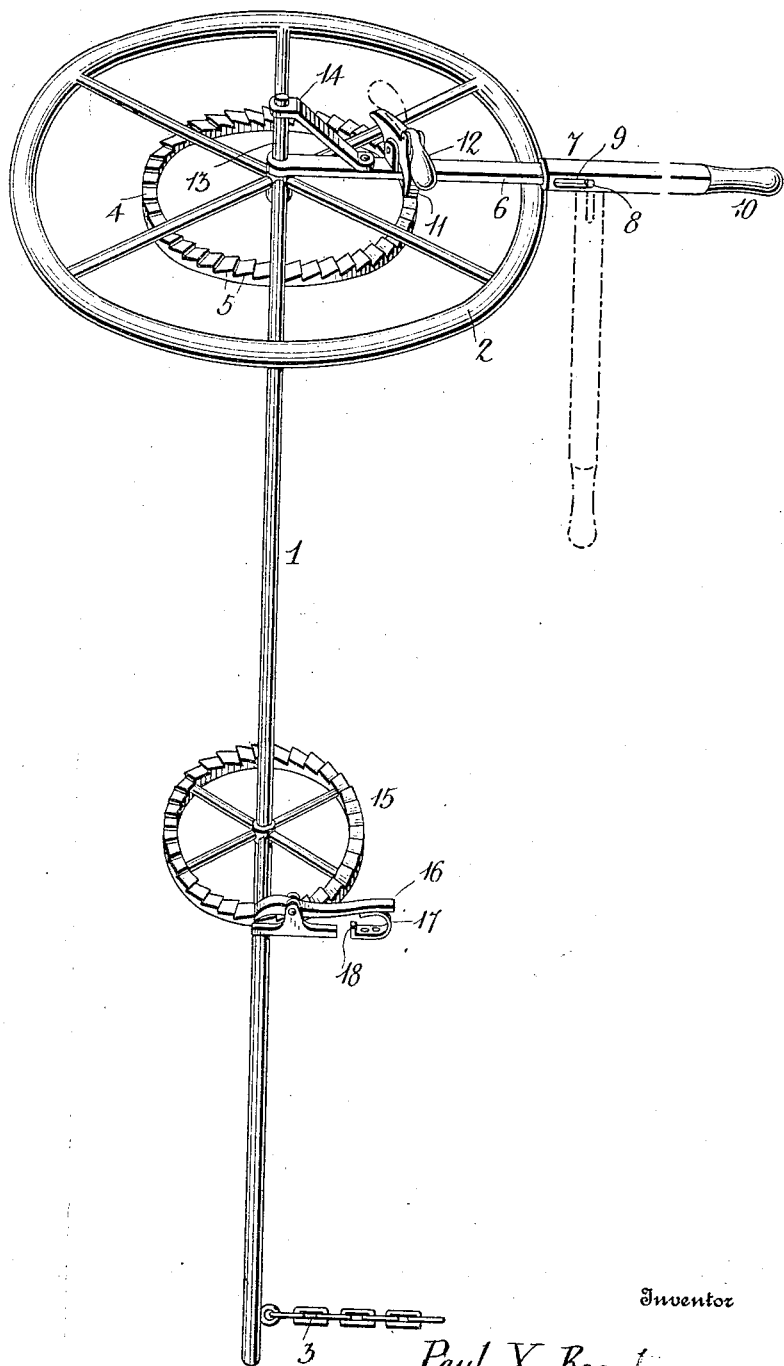
Witnesses
Inventor
Paul X. Beaulieu
By H. B. Willson & Co.
Attorneys

UNITED STATES PATENT OFFICE.

PAUL X. BEAULIEU, OF PRESQUE ISLE, MAINE.

BRAKE.

No. 862,792.  Specification of Letters Patent.  Patented Aug. 6, 1907.

Application filed April 11, 1907. Serial No. 367,596.

*To all whom it may concern:*

Be it known that I, PAUL X. BEAULIEU, a citizen of the United States, residing at Presque Isle, in the county of Aroostook and State of Maine, have invented certain new and useful Improvements in Brakes; and I do declare the following to be a full, clear, and exact description of the invention, such as will enable others skilled in the art to which it appertains to make and use the same.
This invention relates to brakes, and more particularly to the brake mechanism used upon freight cars and like structures, and it has for its object to provide a device of this kind by means of which greater power may be exerted in setting the brake upon the wheels of the car.

In the accompanying drawing is shown a perspective view of a brake shaft adapted to be secured to a freight car, and is provided with mechanism embodying the invention.
The numeral 1 indicates the shaft, which is adapted to be secured in the ordinary manner, which is not necessary to show, and is provided at its upper end with the ordinary hand wheel, and at its lower end, with the ordinary brake chain, 3.
In addition to the ordinary wheel, 2, a smaller wheel, 4, is provided concentric therewith, but in a slightly lower plane, and provided upon its upper face with shoulders or ratchet teeth, 5. Pivotally mounted upon the shaft, 1, above the wheels 4 and 2, is a handle, 6, which extends out beyond the outer wheel and is preferably jointed as shown at 7, by means of which the outer end may be permitted to depend or hang down out of the way, the joint preferably being located at the outer edge of the wheel, 2. In the drawing the ordinary slip joint is shown, in which a pin, 8, projects through a slot, 9, in the outer portion, 10, of the handle, which will permit of great strain being placed upon the outer end, without danger of breaking the handle at the joint. It is evident that the outer portion might be made to telescope within the inner portion, either with or without the joint, in the ordinary manner, or any other form of hinged connection might be used.

Pivotally mounted upon or connected with the inner portion of the handle, 6, is a pawl, 11, which is adapted to engage with the teeth, 5, with its free end, and thereby cause the two wheels and the shaft, 1, to be rotated when the handle, 6, is moved back and forth by the brakeman, or the handle may be given an entire turn around the shaft, 1, with the same result. A weight, 12, is pivotally connected with the pawl, 11, so that when it is thrown forward over the engaging end of the pawl, said end will be caused to engage with the teeth of the wheel, 4, but when the weight is thrown in the opposite direction over the rear end of the pawl, as shown in dotted lines, the free end of the pawl will be lifted out of engagement with the teeth and permit the two wheels and the shaft to rotate in the reverse direction, as when the brake is released. Reversible spring mechanism could be substituted for the weight in any well known manner for causing the pawl to stand in engaging position with the teeth of the wheel, 4, or out of engagement therewith. The upper end of the shaft, 1, is preferably extended above the wheels and lever, as shown at 13, and a stay or brace rod, 14, extends from the upper end thereof to the intermediate portion of the handle, 6, for the purpose of giving greater strength and rigidity to the handle.

A ratchet wheel 15 is preferably secured to the shaft at any convenient point below the brake setting mechanism as above described, and a pawl, 16, is pivotally secured adjacent thereto so that its inner or shorter end is adapted to engage with the teeth of the wheel 15 and thereby prevent the reverse rotation of the shaft when the lever 6 is being returned to cause the pawl 11 to catch a new hold upon the wheel 4 and thereby rotate the shaft when the handle 6 is again drawn forward. The pawl 16 is preferably actuated by the foot, which may be placed upon its outer end and forced downwardly against a spring, 17, which will release it from the wheels 15. If desired, a stop, 18, may be provided as by bending one end of the spring, 2, towards the other, it being shown bent upwards in the drawing.

As above described, it is evident that the brake may be set in the ordinary manner by means of the wheel, 2, and as soon as the strain upon the shaft 1 and the brake chain 3 becomes too great to be overcome by the brakeman, he can place the handle, 6, and the pawl, 11, into operative position and thereby increase the leverage upon the shaft and brake to overcome said resistance, and thereby increase the pressure of the brake upon the car wheel to almost any desired extent.

By providing a car with my improved brake mechanism, as above described, it is evident that a car can be stopped at any point, and, quickly, and it can also be used to slow up a train on down grade, and, especially, if the air brakes should refuse to work. It will also be convenient upon a car where there is hardly room enough for another brake, as when it is loaded with lumber. In this manner wrecks and accidents can be prevented which frequently occur from inability to stop the train through defective or inefficient brake mechanism.

The handle is always held adjacent to or against the outer wheel, 2, by the brace, 14, which will prevent the strain upon the pawl 11 from moving it upward, and the wheel 4 is placed low enough below the plane of the wheel 2 as to prevent the pawl from engaging therewith when the brake is released and the wheel is rotated rapidly.

At any time that the brake is to be released, a slight pressure on the foot pedal, or ratchet, 16, will cause it to be released from the wheel 15 and the parts returned to their normal position. The stop 18 at the end of the spring, 17, can be so arranged as to prevent too great a movement of the free end of the spring, which will have a tendency to break it.

Having described my invention, I claim:

1. In a brake mechanism, a shaft provided with two wheels concentrically mounted upon its upper end, one within the other, the inner wheel being provided with shoulders upon its upper face, a handle pivotally mounted upon the shaft above said wheels, having its end extended beyond the rim of the outer wheel, and a reversible pawl mounted upon said handle in position for engaging with the teeth of the inner wheel.

2. In a brake mechanism, a shaft provided with two wheels concentrically secured to the upper end thereof, the inner one of which is in a lower plane than the outer one and has its upper face provided with shoulders, a handle pivotally secured upon the shaft above said wheels and having its end extended beyond the outer wheel, a pawl on the handle in position for engaging with the teeth of said inner wheel, and a weight adapted to be swung toward either end of the pawl for controlling its movement relatively to the inner wheel.

3. In a brake mechanism, a shaft provided with two wheels near its upper end, a handle pivotally mounted upon the shaft and extended beyond the outer wheel, means upon the handle for engaging with the inner wheel for rotating it, and a brace extending from the upper end of said shaft to the intermediate portion of said handle.

4. In a brake mechanism, a shaft provided with two wheels at its upper portion, a handle pivotally secured to the shaft and provided with means for engaging with one of said wheels for rotating it, said handle extending beyond the outer wheel and being jointed adjacent thereto, whereby the outer end may be swung downwardly out of the way.

In testimony whereof I have hereunto set my hand in presence of two subscribing witnesses.

PAUL X. BEAULIEU.

Witnesses:
ALFRED BEAULIEU,
E. S. PERRY.